(12) United States Patent
Rass et al.

(10) Patent No.: US 8,303,223 B2
(45) Date of Patent: Nov. 6, 2012

(54) FASTENER FOR ARRANGING A ROD ELEMENT ON A MOUNTING CHANNEL

(75) Inventors: Franz Rass, Oberndorf/T. (AT); Peter Mugg, Nueziders (AT); Thomas Merhar, Schaan (LI); Peter Woergartner, Oberndorf/T. (AT)

(73) Assignee: Hilti Aktiengesellschaft, Schaan (LI)

( * ) Notice: Subject to any disclaimer, the term of this patent is extended or adjusted under 35 U.S.C. 154(b) by 342 days.

(21) Appl. No.: 12/658,411

(22) Filed: Feb. 8, 2010

(65) Prior Publication Data

US 2010/0202851 A1  Aug. 12, 2010

(30) Foreign Application Priority Data

Feb. 10, 2009  (DE) .................... 10 2009 000 736

(51) Int. Cl.
*F16B 27/00* (2006.01)
(52) U.S. Cl. ............... 411/85; 411/112; 248/58
(58) Field of Classification Search .............. 411/84, 411/85, 104, 112, 970; 248/58, 59
See application file for complete search history.

(56) References Cited

U.S. PATENT DOCUMENTS

| | | | | |
|---|---|---|---|---|
| 2,936,991 A | * | 5/1960 | Picha et al. ................. 248/343 |
| 5,655,865 A | | 8/1997 | Plank et al. ..................... 411/85 |
| 6,290,426 B1 | * | 9/2001 | van Gijsel et al. ......... 403/374.3 |
| 7,241,094 B1 | * | 7/2007 | Potts et al. ..................... 411/85 |
| 7,326,017 B2 | | 2/2008 | Winker ......................... 411/533 |
| 7,568,868 B2 | * | 8/2009 | Motsch et al. ................ 411/112 |
| 2003/0185643 A1 | * | 10/2003 | Thompson ..................... 411/85 |

FOREIGN PATENT DOCUMENTS

| | | |
|---|---|---|
| DE | 87 15 256 U1 | 4/1988 |
| DE | 94 14 591 | 10/1994 |
| DE | 44 21 252 A1 | 12/1995 |
| DE | 10 2004 013372 A1 | 10/2005 |

\* cited by examiner

*Primary Examiner* — Gary Estremsky
(74) *Attorney, Agent, or Firm* — Davidson, Davidson & Kappel, LLC

(57) ABSTRACT

The invention relates to a fastener (21) for arranging a rod element (9) on a mounting channel, said fastener (21) including an engaging part (22) that can be inserted and made to engage behind edges (14) of an installation opening of the mounting channel, whereby the engaging part (22) has an opening (25) with an internal thread for the rod element, a stop plate (42) for making contact on the outside of the mounting channel having a hole (44) through which the rod element (9) passes, and flexible connection elements (32) that connect the engaging part (22) to the stop plate (42; 76; 96) at a distance from each other. Moreover, a nut element (52) that has a hole (53) with an internal thread and that serves to secure the rod element (9) to the mounting channel can be rotatably held on the stop plate (42) using a holding device (62).

10 Claims, 4 Drawing Sheets

FASTENER FOR ARRANGING A ROD ELEMENT ON A MOUNTING CHANNEL

This claims the benefit of German Patent Application No. DE 10 2009 000 736.9-24, filed on Feb. 10, 2009 and hereby incorporated by reference herein.

The invention relates to a fastener for arranging a rod element on a mounting channel.

BACKGROUND

In the realm of utilities in buildings, channel systems are used to which lines, for example, for water, heating, ventilation, air-conditioning and/or electric installations can easily be attached by means of suitable fasteners such as, for instance, pipe clamps and channel nuts. Channel systems are also fitted with devices for suspending components whose rod elements can likewise be attached to the channel systems by means of suitable fasteners.

A so-called C-shape mounting channel as disclosed, for example, in German utility model DE 87 15 256 U1, is often used for such a channel system. The interior space enclosed by the mounting channel is accessible from the outside through an installation opening that runs along the longitudinal extension of the mounting channel and that is laterally delimited by edges. The installation opening has a clear width running perpendicular to the longitudinal extension of the mounting channel and that is smaller than the corresponding internal dimension of the interior space of the mounting channel.

German patent application DE 44 21 252 A1 discloses a fastener with which a rod element that has a thread, at least in a certain area, can be arranged on a mounting channel. The fastener has an engaging part that can be inserted and that can engage behind edges of the installation opening of the mounting channel, whereby the engaging part has an opening with an internal thread for the rod element, a stop plate for making contact with the outside of the mounting channel having a hole through which the rod element passes, and a flexible connection element that connects the engaging part to the stop plate at a distance from each other. The engaging part has a width that is smaller than the clear width of the installation opening, and a length that is greater than the clear width of the installation opening.

In order to arrange the rod element such as, for example, a threaded rod, on the mounting channel, first of all, a nut such as a hexagonal nut, is screwed, as the nut element, sufficiently far onto a thread of the rod element, so that this section of the rod element can still be attached in the internal thread of the engaging part. Subsequently, this section of the rod element having the thread is passed through the hole in the stop plate and screwed into the opening of the engaging part. Once the engaging part has been inserted through the installation opening into the mounting channel, the engaging part is rotated in the interior space of the mounting channel in that the fastener or the rod element is rotated and thus brought into a position where it engages behind the edges of the installation opening. In this position of the engaging part, the nut that was previously screwed onto the rod element can be screwed in the direction of the stop plate whereby, once the nut has come into contact with the stop plate, the engaging part is moved in the direction of the stop plate until the fastener is detachably secured to the mounting channel. The flexible connection element becomes deformed during the securing procedure, thereby reducing the distance between the engaging part and the stop plate until the engaging part makes contact with the edges of the installation opening.

SUMMARY OF THE INVENTION

It is an object of the invention to improve the prior-art fastener in such a way that it can have fewer individual parts.

The present invention provides a fastener for arranging a rod element, which has a thread at least in a certain area, on a mounting channel, said fastener comprising an engaging part that can be inserted and made to engage behind edges of an installation opening of the mounting channel, whereby the engaging part has an opening with an internal thread for the rod element, a stop plate for making contact on the outside of the mounting channel having a hole through which the rod element can be passed, and at least one flexible connection element that connects the engaging part to the stop plate at a distance from each other.

According to the invention, a nut element having a hole with an internal thread that serves to secure the rod element to the mounting channel can be rotatably held on the stop plate by means of a holding device.

The thread in the nut element and the thread in the opening of the engaging part both can have the same thread pitch. Since the nut element is arranged directly on the stop plate, there is no need to previously arrange said nut element on the rod element. The nut element and the engaging part are arranged on the rod element at the same time, as a result of which the effort involved in the installation and the associated time requirement are considerably reduced in comparison to prior-art approaches. Consequently, the nut element cannot be lost or forgotten. Up until now, if the preceding placement of the nut on the rod element had been forgotten, the rod element had to be dismantled or the nut had to be subsequently screwed over the free end of the rod element with great difficulty and along almost the entire longitudinal extension of the rod element. With the fastener according to the invention, it is easier to install the fastener. Users need to take along fewer individual parts for mounting the clamp fastening or suspension, and the fastener according to the invention can be produced cost-effectively.

Preferably, the nut element is held on the stop plate in such a way that it can be moved to a limited degree relative to the stop plate, as a result of which, when the rod element is arranged on the fastener arrangement, the two threads in the nut element and in the engaging part can meet. Advantageously, the amount by which the nut element can move relative to the stop plate is one to three leads of the internal thread in the nut element.

Preferably, at least one clamping section is provided on a section of the holding device facing the nut element in order to detachably hold the nut element on the stop plate, as a result of which a blockage is created between the nut element and the stop plate, thus preventing the nut element from rotating along with the rod element when the latter is being screwed into the fastener, thus ensuring a simple handling of the fastener. The height of the at least one clamping section advantageously corresponds to at least the lead of one thread. As an alternative or in addition thereto, a blocking means such as a coating or a separate, e.g. elastic, element is provided between the nut element and the stop plate, said element generating a friction between these parts that can only be overcome beyond a pre-specified torque.

Preferably, a profile that can be put in contact with an outer contour of the nut element is provided on a free edge of the holding device, said profile comprising, for instance, several noses that are at a distance from each other. In the case of a nut element having a hexagonal outer contour as the application point for the rotational force, the profile engages, for example, with the corners of this outer contour, thus ensuring a sufficient blockage of the nut element when the fastener is arranged on the rod element.

Preferably, the nut element has an encircling collar on the outside, whereby the holding device advantageously engages with the collar. Especially advantageously, the nut element is configured as a so-called cap nut, which is available as an inexpensive mass-produced item, thus ensuring a cost-effective production of the fastener.

Preferably, the holding device comprises several tabs that engage around sections of the nut element, which allows the nut element to be held on the stop plate in such a way that it is easily detachable, and also translates into a cost-effective production of the fastener.

Preferably, the holding device is made of spring steel that exerts sufficient holding force onto the nut element. Moreover, thanks to its elasticity, the holding device made of spring steel ensures adequately large axial mobility of the nut element for purposes of arranging the rod element on the fastener. This holding device is advantageously manufactured by means of a punching or bending method.

As an alternative, the holding device is made of plastic which, owing to its material properties, can exert sufficient holding force onto the nut element. Moreover, due to its elasticity properties, the holding device made of plastic ensures adequately large axial mobility of the nut element for purposes of arranging the rod element on the fastener. This holding device is advantageously manufactured by means of an injection-molding or casting method.

Preferably, the flexible connection element and the holding device are configured in one piece, which accounts for a simple manufacture of the fastener. At least one through hole is advantageously provided in the stop plate, through which at least one section of the flexible connection element with the holding device can be inserted. The flexible connection element and the holding device are made of one material or of several materials that are joined to each other, for example, by means of an injection-molding or casting method.

As an alternative, the stop plate and the holding device are configured in one piece, which translates into a simple manufacture of the fastener. The holding device is made, for example, of partially punched sections of the stop plate. Advantageously, the stop plate with the holding device is manufactured by means of a punching or bending method.

BRIEF DESCRIPTION OF THE DRAWINGS

The invention will be explained in greater detail below on the basis of embodiments. The following is shown.

DETAILED DESCRIPTION

Figure 1:
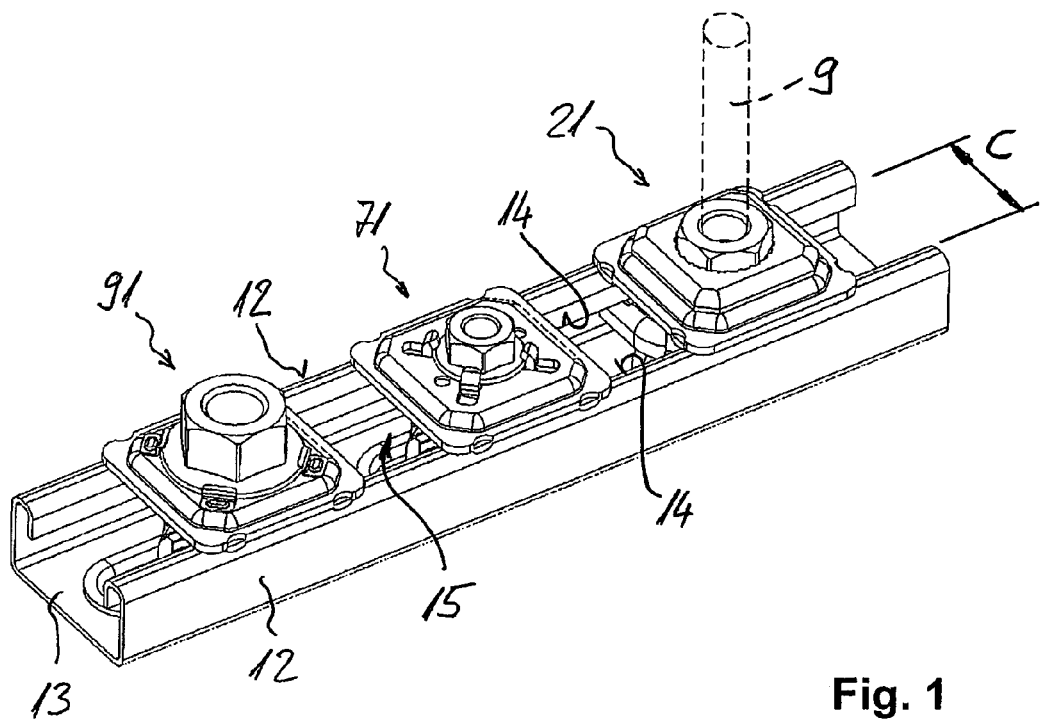
FIG. 1—a perspective view of three embodiments of a fastener arranged on a mounting channel.
Figure 2:
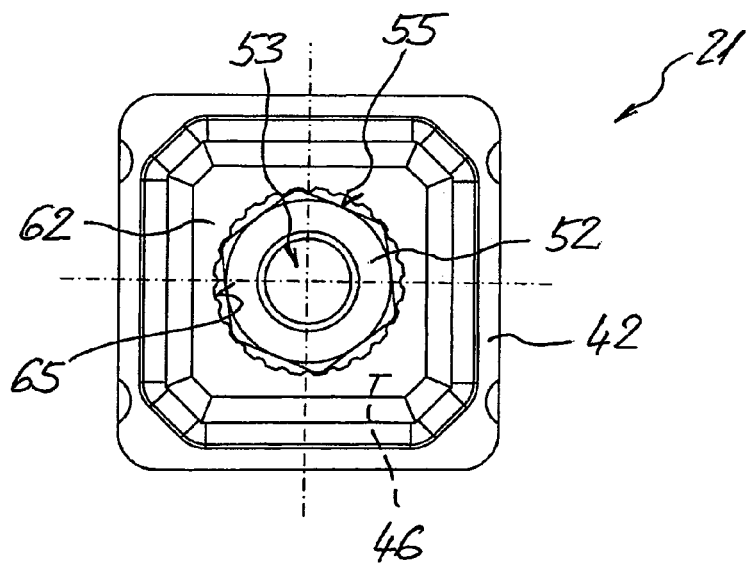
FIG. 2—a plan view of the first embodiment of a fastener.
Figure 3:
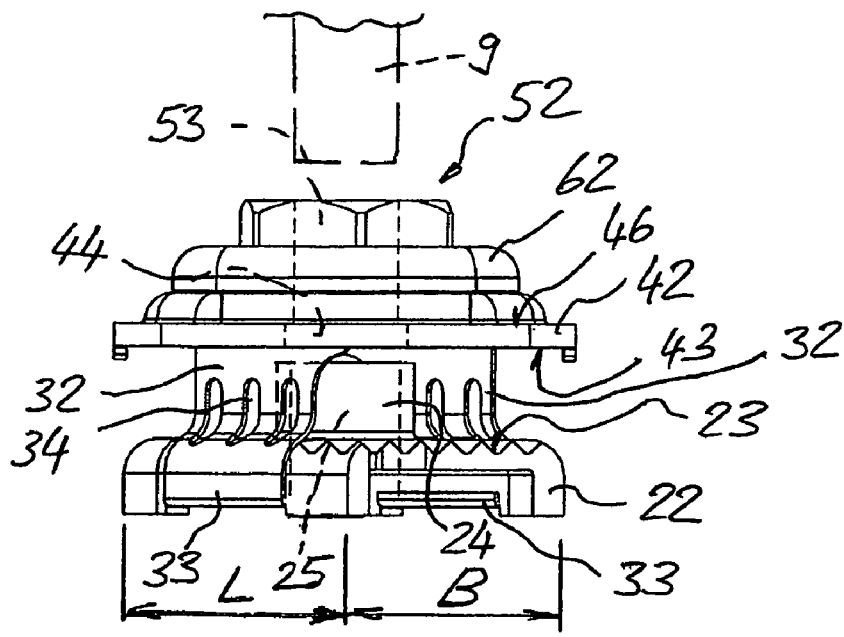
FIG. 3—a side view of the fastener shown in FIG. 2.
Figure 4:
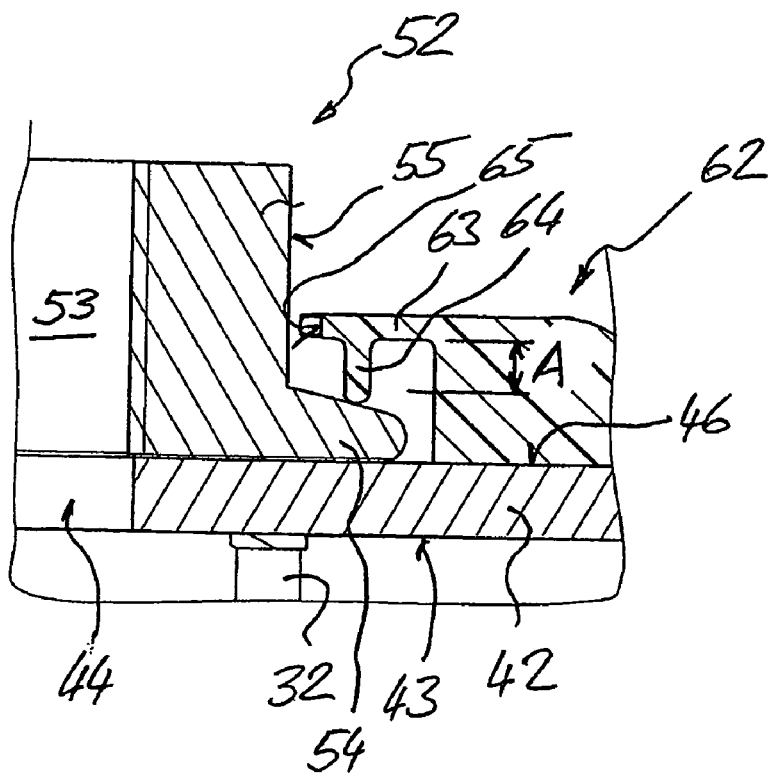
FIG. 4—a detailed section of the nut element with a holding device.

The fastener 21 shown in FIGS. 1 to 4 serves to arrange a rod element 9 such as a threaded rod, on a mounting channel 11.

The mounting channel 11 has—as the profile walls—two opposite side walls 12, a rear wall 13 that connects these side walls 12 and, opposite from this rear wall 13, an installation opening 15 that is delimited by edges 14 and that runs in the longitudinal extension of the mounting channel 11. The installation opening 15 has a clear width C that runs perpendicular to the longitudinal extension of the mounting channel 11, and this clear width C is defined by the free ends of the edges 14 that are bent towards the inside. The mounting channel 11 surrounds an interior space that is accessible from the outside through the installation opening 15.

The fastener 21 has an engaging part 22 whose width B is smaller than the clear width C of the installation opening 15 in the mounting channel 11, and whose length L is greater than the clear width C of the installation opening 15 in the mounting channel 11. The securing surfaces 23 of the engaging part 22 are provided with teeth to improve the engagement with the free ends of the edges 14 of the installation opening 15 that are optionally likewise provided with teeth. A sleeve section 24 that forms an opening 25 provided with an internal thread for the rod element 9 on the engaging part 22 protrudes with its securing surfaces 23 from the side of the engaging part 22. The opening 25 is advantageously configured so as to be continuous, which allows the rod element 9 to be adjustable over a broad range in the direction of its longitudinal extension.

Moreover, the fastener 21 has a stop plate 42 whose contact side 43 comes into contact with the outside of the mounting channel 11 adjacent to the installation opening 15 when the fastener 21 is arranged on the mounting channel 11, thus impinging on it frontally. Opposite from the contact side 43, the stop plate 42 has a securing surface 46. The stop plate 42 is also provided with a hole 44 through which the rod element 9 passes, whereby the rod element 9 can rotate freely in this hole 44.

The engaging part 22 is connected by two flexible connection elements 32 that are opposite from each other and that connect the engaging part 22 to the stop plate 42 at a distance from each other. The connection elements 32 ensure that there is a sufficient distance between the engaging part 22 and the stop plate 52 so that the engaging part 22 can be inserted into the mounting channel 11 and can be rotated into a position where it engages behind the edges 14 of the mounting channel 11. Each connection element 32 has a surrounding section 33 to surround areas of the engaging part 22. A section of the connection element 32 located on the opposite side is attached directly to the stop plate 42. The connection elements 32 are made of sheet metal by means of a punching or bending method and each have several cutouts 34 in order to increase their deformability.

Via a holding device 62, a nut element 52 having a hole 53 with an internal thread is rotatably held on the stop plate 42 for purposes of securing the rod element 9 on the mounting channel 11. Moreover, the nut element 52 can be moved to a limited degree relative to the stop plate 42 up to the amount of two leads of the internal thread of the hole 53. The nut element 52 is configured as a cap nut and has an encircling collar 54 on the outside.

The holding device 62, which is made of plastic in this example, is fastened directly to the stop plate 42 and connected to the connection elements 32. The holding device 62 engages with the collar 54 of the nut element 52 along its entire circumference by means of a section 63 facing the outer contour 55, said section 63 being at a distance from the outside of the collar 54, opposite to the insertion direction of the rod element 9. The distance A between the section 63 and the outside of the collar 54 amounts to one lead of the internal thread in the hole 53 of the nut element 52.

On the section 63 of the holding device 62 facing the nut element, there are several clamping sections 64 that are distributed along the circumference for purposes of detachably holding the nut element 52 on the stop plate 42 and that extend all the way to the outside of the collar 54 of the nut element 52 when the fastener 21 is in its unsecured state, whereby the outside faces the section 63 of the holding device 62. Moreover, a free edge 65 of the holding device 62 has a profile that can be brought into contact with the outer contour 55 of the nut element 52.

In a first step, the fastener 21 is screwed onto an end of the rod element 9 that is provided with an external thread, whereby the rod element 9 penetrates into the nut element 52. When this end of the rod element 9 is screwed further, it passes through the hole 44 in the stop plate 42 and then engages with the internal thread in the opening 25 in the engaging part 22. Owing to the restricted axial mobility of the nut element 52 and/or of the engaging part 22, the thread of the rod element 9 and of the engaging part 22 can meet. Due to the self-blocking of the nut element 52 on the stop plate 42, the latter is prevented from being rotated along during this installation step. Then the engaging part 22 is inserted into the mounting channel 11 and rotated into the position for engaging behind the edges 14 of the installation opening 15. Due to the rotation of the nut element 52 over the outer contour 55 that serves as an application point for the rotational force, the engaging part 22 is moved in the direction of the stop plate 42 until the engaging part 22 lies on the edges 14 of the mounting channel 11 and the fastener 21 is secured. If a predefined torque is exceeded, the self-blocking of the nut element 52 on the stop plate 42 is cancelled.

Figure 5:
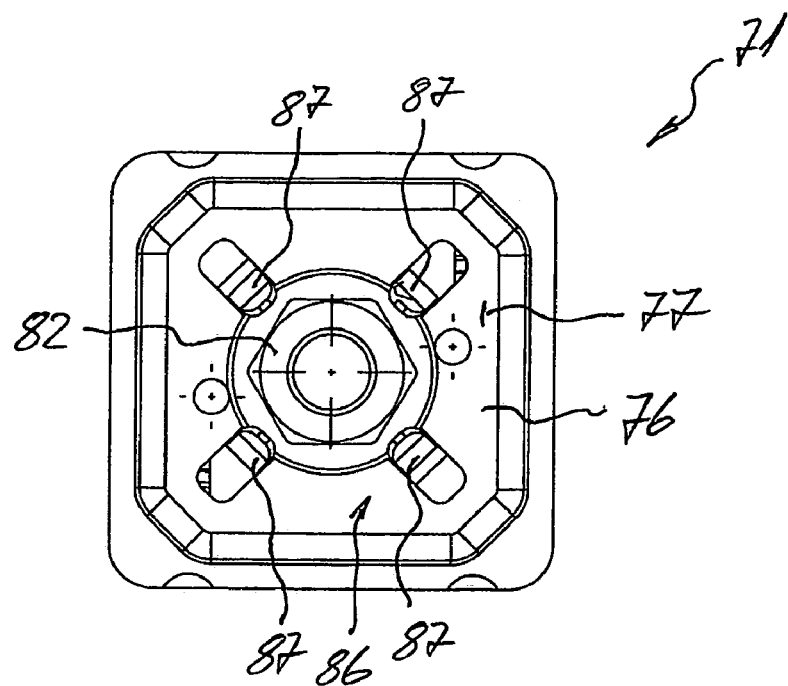
FIG. 5—a plan view of the second embodiment of a fastener.
Figure 6:
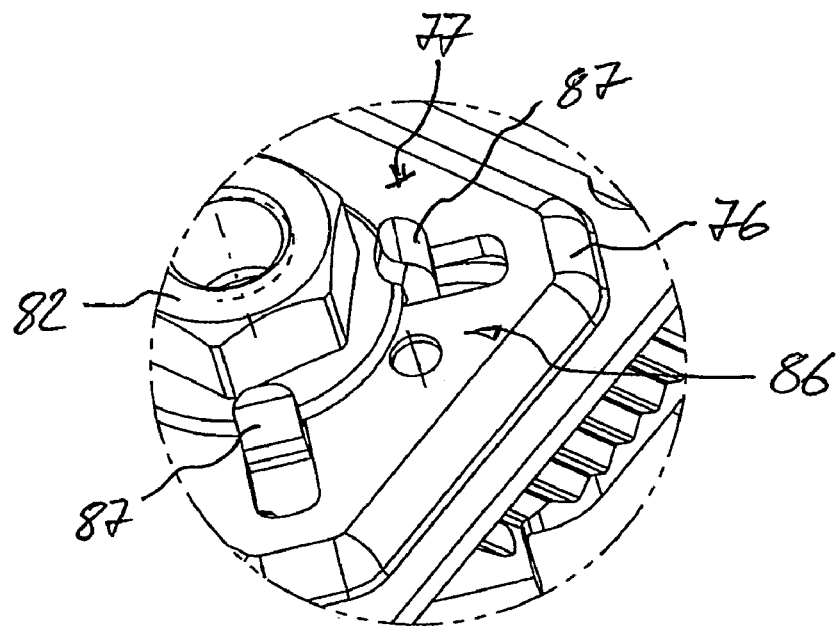
FIG. 6—a perspective detailed view of the fastener shown in FIG. 5.

The fastener 71 shown in FIGS. 1, 5 and 6, diverging from the previously described fastener 21, has—as the holding device 86—four tabs 87 that engage around areas of the nut element 82 and that are configured as a single piece together with the stop plate 76 and that project with their free ends beyond the securing surface 77 of the stop plate 76.

Figure 7:
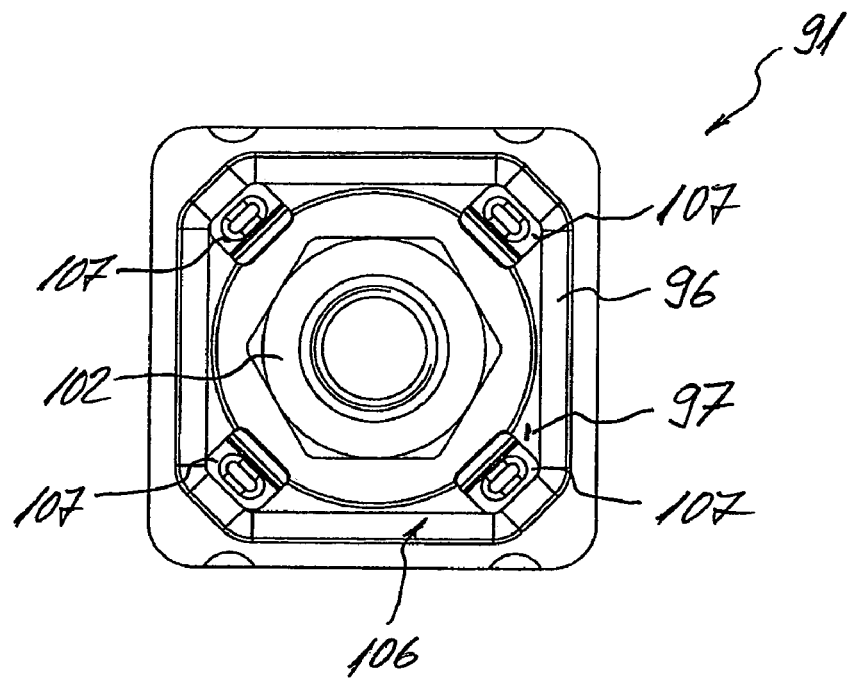
FIG. 7—a plan view of the third embodiment of a fastener.
Figure 8:
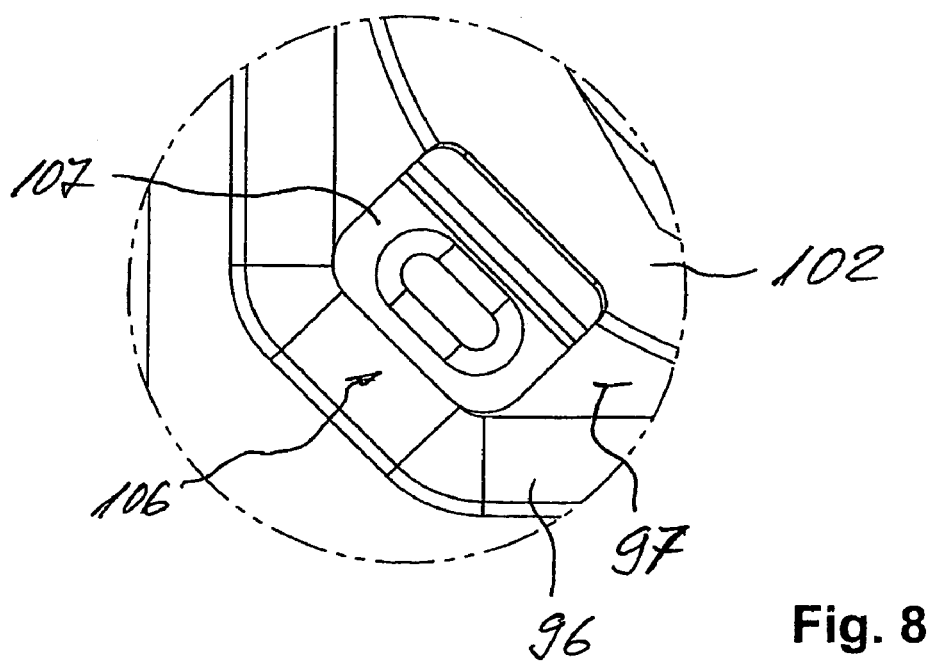
FIG. 8—a detailed view of the fastener shown in FIG. 5.

The fastener shown in FIGS. 1, 7 and 8, diverging from the previously described fastener 21, has as the holding device 106 four Z-shaped tabs 107 made of spring steel that are positively attached, for example, soldered or glued, to the securing surface 97 of the stop plate 96 and whose free ends engage around areas of the nut element 102.

What is claimed is:

1. A fastener for arranging a rod element, the rod element having a thread at least in a certain area, on a mounting channel, the fastener comprising:
    an engaging part insertable and made to engage behind edges of an installation opening of the mounting channel, the engaging part having an opening with an internal thread for the rod element,
    a stop plate for making contact on the outside of the mounting channel, the stop plate having a hole, the rod element passable through the hole,
    at least one flexible connection element connecting the engaging part to the stop plate at a distance from each other, and
    a nut element having a further hole with a further internal thread, the nut element for securing the rod element to the mounting channel, the nut element rotatably holdable on the stop plate by a holding device.

2. The fastener as recited in claim 1 wherein the nut element is held on the stop plate so as to be movable to a limited degree relative to the stop plate.

3. The fastener as recited in claim 1 further comprising at least one clamping section provided on a section of the holding device facing the nut element in order to detachably hold the nut element on the stop plate.

4. The fastener as recited in claim 1 wherein a free edge of the holding device has a profile contactable with an outer contour of the nut element.

5. The fastener as recited in claim 1 wherein the nut element has an encircling collar on the outside.

6. The fastener as recited in claim 1 wherein the holding device comprises several tabs engageable around sections of the nut element.

7. The fastener as recited in claim 1 wherein the holding device is made of spring steel.

8. The fastener as recited in claim 1 wherein the holding device is made of plastic.

9. The fastener as recited in claim 1 wherein the flexible connection element and the holding device are configured in one piece.

10. The fastener as recited in claim 1 wherein the stop plate and the holding device are configured in one piece.

* * * * *